United States Patent [19]

Fujishige

[11] Patent Number: 4,669,007

[45] Date of Patent: May 26, 1987

[54] MAGNETIC RECORDING/REPRODUCING APPARATUS

[75] Inventor: Sadao Fujishige, Nagano, Japan

[73] Assignee: Kabushiki Kaisha Sankyo Seiki Seisakusho, Nagano, Japan

[21] Appl. No.: 747,531

[22] Filed: Jun. 21, 1985

[30] Foreign Application Priority Data

Jun. 22, 1984 [JP] Japan .................................. 59-128958

[51] Int. Cl.⁴ .............................................. G11B 5/012
[52] U.S. Cl. ...................................... 360/97; 360/107; 369/63; 446/302
[58] Field of Search ..................................... 360/97–99; 446/299, 302; 369/63–65

[56] References Cited

U.S. PATENT DOCUMENTS 3,531,062 9/1970 Sindlinger ........................ 446/302 X

FOREIGN PATENT DOCUMENTS 45-11381 4/1970 Japan .
100184 2/1975 Japan .

Primary Examiner—A. J. Heinz
Attorney, Agent, or Firm—Sughrue, Mion, Zinn, Macpeak, and Seas

[57] ABSTRACT

A magnetic recording/reproducing apparatus of small size, small weight, and suitable for incorporation into a child's toy or the like. A magnetic disc is supported on a shaft, the latter being driven rotationally by a wind-up spring. A governor is provided for controlling the releasing force of the spring to thereby cause the disc to be rotated at a constant speed. A magnetic head is moved linearly and radially along the disc in synchronism with the rotation of the disc supporting shaft and in sliding contact with the disc. A spring-biased mode changeover member is provided for selecting between the recording and reproducing modes, the mode changeover member being normally urged to the reproducing mode position.

7 Claims, 42 Drawing Figures

MAGNETIC RECORDING/REPRODUCING APPARATUS

BACKGROUND OF THE INVENTION

The present invention relates generally to a magnetic recording/reproducing apparatus in which a magnetic disc and a magnetic head are driven by a spring used as a drive source, and more particularly, to a magnetic recording/reproducing apparatus which is suitable to be incorporated into a toy.

Conventionally, a large number of apparatuses adapted to be incorporated into toys for generating sound are known. One such apparatus is disclosed in Japanese Laid-Open Patent Application No. 100184/1976. In this apparatus, in which a disc having sound grooves is driven by a spring, recording cannot be performed, only reproducing. Another apparatus, similar to that described above, is disclosed by Japanese Patent Publication No. 11381/1970; however, this apparatus is also only capable of reproduction.

It is possible to incorporate a tape recorder into a toy. However, a tape recorder is bulky and expensive, and therefore a toy using a tape recorder is expensive. Further, since a tape recorder is driven by an electric motor, the power consumption power is high. Also, there is a serious problem that the apparatus is heavy.

SUMMARY OF THE INVENTION

It is thus an object of the present invention to provide such a recording/reproducing apparatus which is inexpensive, small in size, capable of recording as well as reproducing, and otherwise well adapted to be incorporated into a toy.

In accordance with this and other objects, the invention provides a recording/reproducing apparatus comprising: a disc supporting shaft for engaging and supporting a magnetic disc; a spring drive source for rotating the disc supporting shaft; means for winding a spring of the spring drive source; governor means for adjusting a releasing force of the spring to thereby cause the disc supporting shaft to rotate at a constant speed; a magnetic head linearly moving in synchronism with the disc supporting shaft to track a spiral path on a magnetic disc, the head being in sliding contact with the magnetic disc; an erase head supported by a head block carrying the magnetic head; a mode changeover member for selectively selecting between a recording mode and a reproducing mode, the member being normally urged toward its reproducing mode position; means for limiting the operating range of the spring; and a power switch for turning on/off the supply of power.

Upon completion of winding the spring, the magnetic disc is rotated, and at the same time the magnetic head is moved to a starting position. The power switch is maintained off at the winding termination position of the spring. When the winding operation of the spring is completed, the magnetic disc is rotated by the force of the spring, and at the same time, the magnetic head is linearly moved. The power switch is turned on when the spring has been slightly released. The rotation of the magnetic disc and the linear movement of the magnetic head brings the magnetic head into sliding contact with the disc and causes the head to trace a track to thereby perform reproducing. When the termination position of the operating region of the spring has been reached, the rotation of the disc and the movement of the magnetic head are stopped, and at the same time, the power switch is turned off. During the period from the starting to stopping of the rotation of the disc, that is, while the reproducing operation is being performed, the releasing force of the spring is controlled by a governor mechanism, and therefore the magnetic disc is rotated at a constant speed. In such a reproducing mode, an erase head is maintained separated from the magnetic disc.

In the recording mode, the mode changeover member is operated, and the erase head acts on the magnetic disc to erase the previously recorded signal. Then, after the spring has been wound in the same manner as in the reproducing mode, while the disc is rotating and the magnetic head is moving in the same manner as in the reproducing mode, a sound signal is recorded on the disc.

BRIEF DESCRIPTION OF THE DRAWINGS

FIG. 37 is viewed in the direction of an arrow I.

DESCRIPTION OF THE PREFERRED EMBODIMENTS

Figure 1:
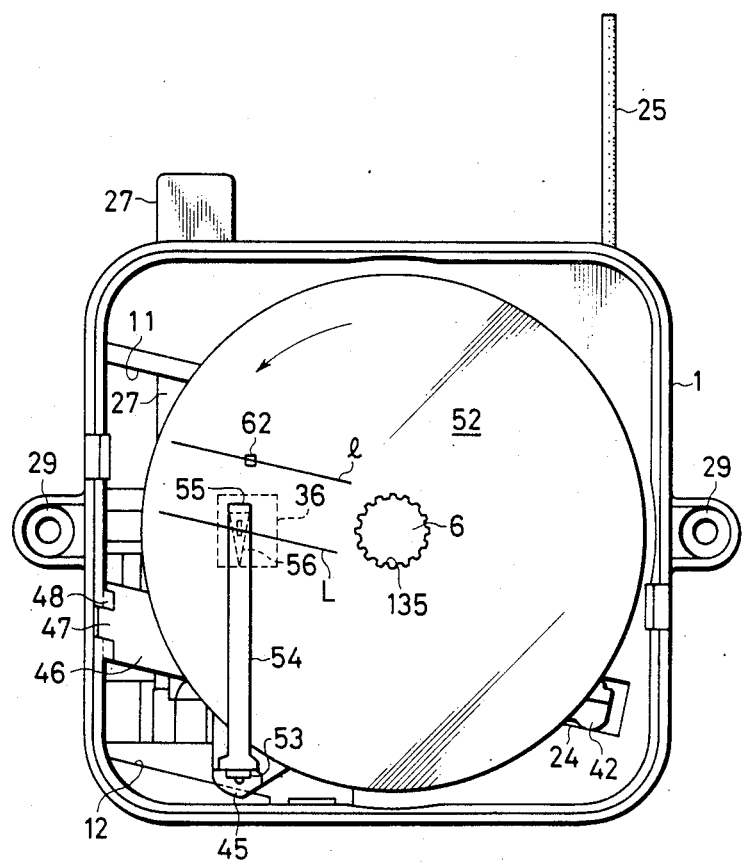
FIG. 1 is a plan view showing a preferred embodiment of a recording/reproducing apparatus according to the present invention.
Figure 3:
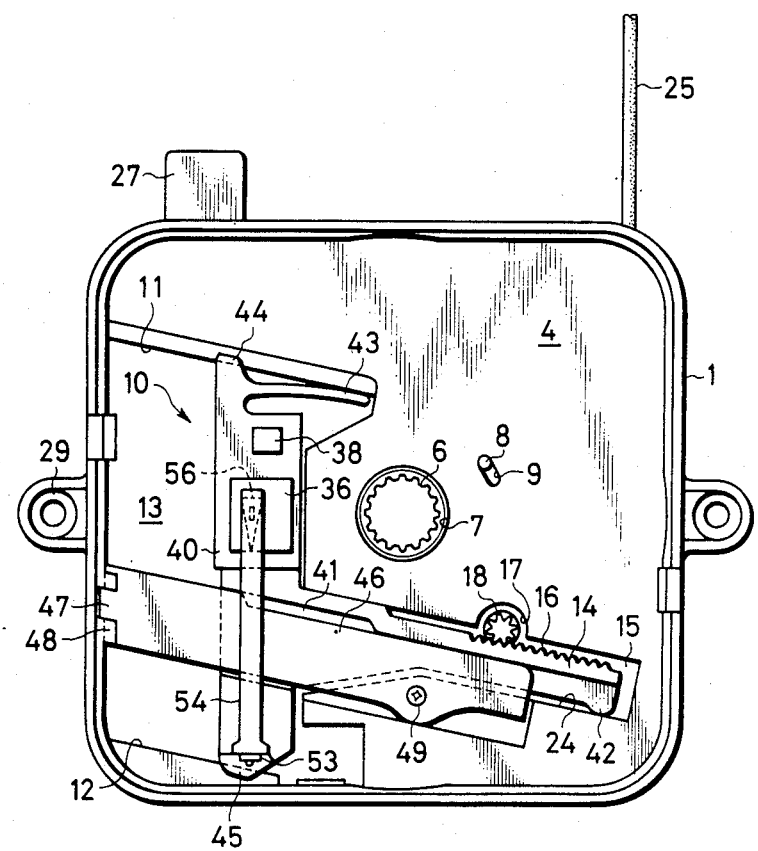
FIG. 3 is a plan view of the same from which a magnetic disc has been removed.
Figure 6:
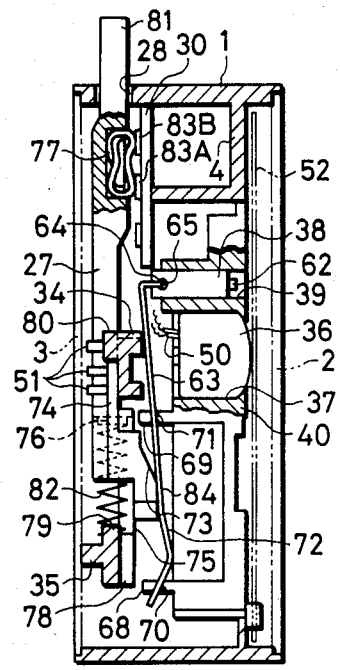
FIG. 6 is a cross-sectional view taken along a line A—A in FIG. 2 showing a state where a mode changeover member is in the reproducing mode.
Figure 27:
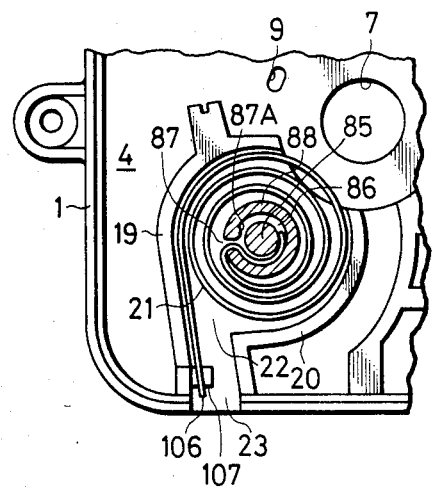
FIG. 27 is a bottom view showing a spring storage portion.
Figure 35:
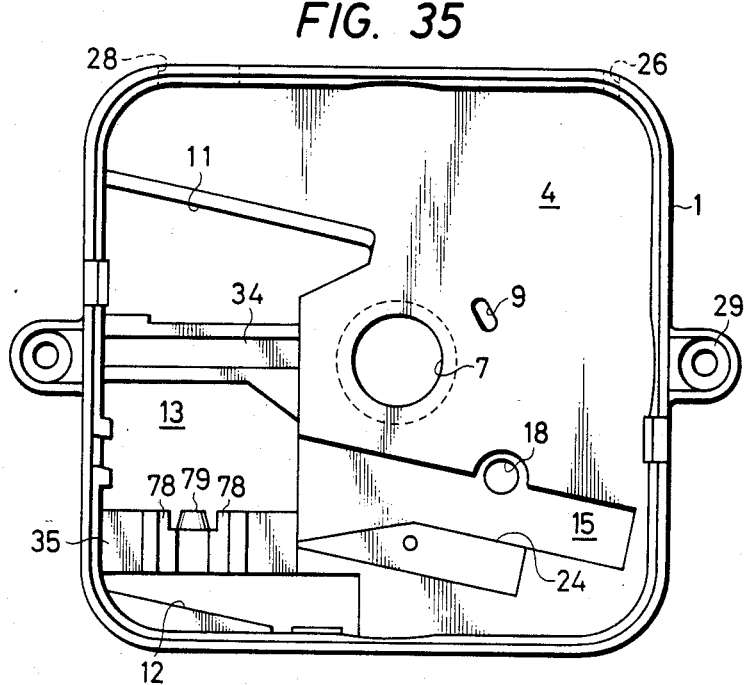
FIG. 35 is a plan view of the casing.
Figure 36:
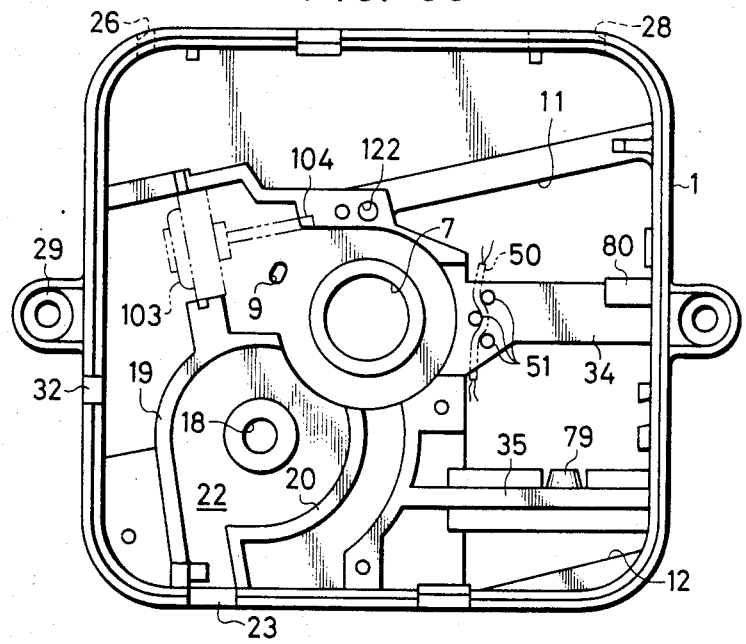
FIG. 36 is a bottom view of the same.
Figure 37:
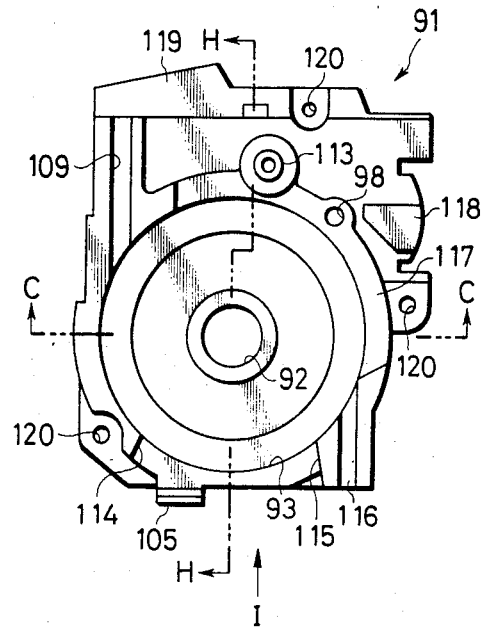
FIG. 37 is a bottom view showing an inner casing formed with restrictions.

In FIG. 1, reference numeral 1 designates a casing of the magnetic recording/reproducing apparatus. A front and a rear cover 2 and 3 are to be attached to the casing 1 as shown in FIG. 6; however, the covers are omitted in this drawing for clarity. As shown in FIG. 3 and 35, a substrate 4 of the casing 1 formed with a hole 7 through which a hub 6 of a disc supporting shaft 5 (see FIG. 8) projects; an elongated hole 9 through which a clutch shaft 8 (see FIG. 8) of a governor is supported at one end so as to be movable radially; an opening portion 13 in which a magnetic head block 10 is fitted and which has a side edge 11 and a first reference surface 12 disposed substantially parallel to each other; a recess portion 15 in which a rack portion 14 of the magnetic head block 10 is fitted; and a hole 18 through which a pinion 17 meshed with a rack 16 of the rack portion 14 projects. In the back surface of the substrate 4, as shown in FIGS. 27 and 36, a spring storage portion 22 for storing a spring 21 is defined by partial peripheral walls 19 and 20 disposed about the hole 18 through which the pinion 17 projects. The spring storage portion 22 communicates with the outside of the casing 1 through a spring winding inlet. One side edge 24 (see FIG. 35) of the recess portion 15 is substantially parallel to the first reference surface 12. The side edge 24 is referred to as a second reference surface 24.

Figure 2:
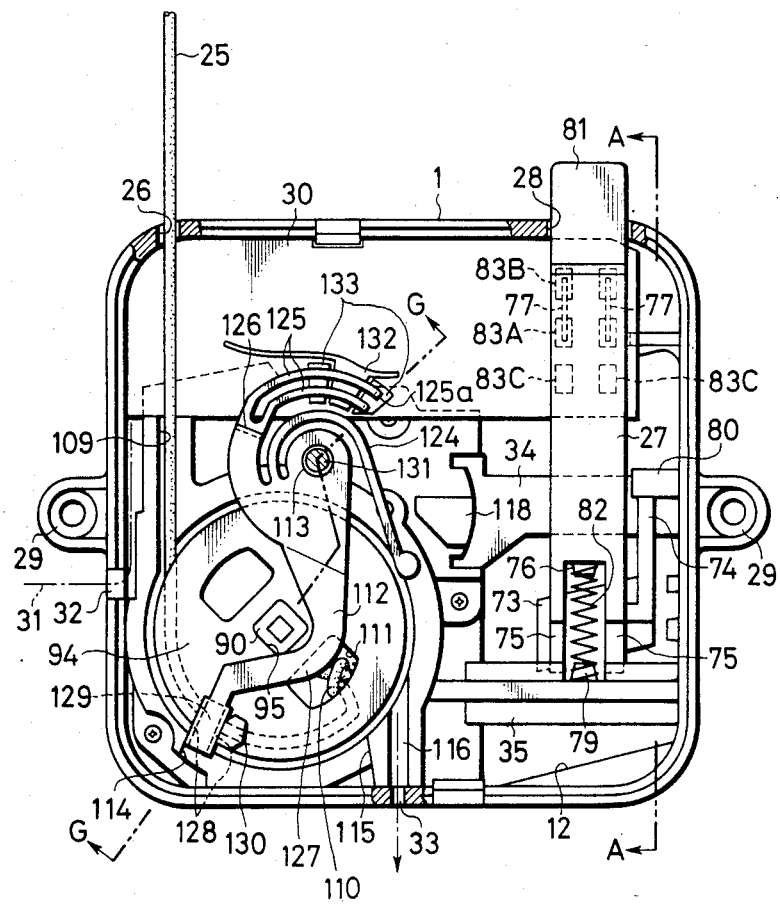
FIG. 2 is a bottom view of the same.

As shown in FIG. 2, the casing 1 is formed with a hole 26 through which a winding cord 25, used as a spring winding device, passes; a hole 28 through which a mode changeover member 27 is guided; a pair of attachment portions 29 and 29 for attaching the casing to the body of a toy (not shown); a notch 32 through which lead wires 31 connecting a printed substrate 30 to a battery cell, a speaker, and the like (not shown) pass through the casing 1; and a hole 33 through which the winding cord 25 passes from a position selected depending on the shape of the toy.

As shown in FIGS. 2, 6, 35 and 36, the casing 1 is formed close to its bottom with a guiding portion 34 for slidably guiding the mode changeover member 27, and a guiding rail portion 35 for engaging with the forward end of the changeover member.

Referring to FIGS. 11 to 19, the arrangement of the magnetic head block 10 will be described. The magnetic head block 10 is constituted by a block body 40 formed with a head supporting hole 37 to which a magnetic head 36 is fitted to be supported thereby (see FIGS. 3 to 7) and a guiding hole 39 to which an erase head 38 is slidably fitted. The rack portion 14 extends from the block body. The rack portion 14 is formed with a step portion 41, continuous with the upper portion of the body 40, and a second expansion sliding-contact portion 42 which abuts the second reference surface 24 (see FIGS. 1 and 3). At one end of the block body 40, there are formed an elastic arm 43 and an engaging step portion 44, which engages downwardly in sliding contact with the side edge 11 of the opening portion 13 of the substrate 4. At the other end of the block body 40, there is formed a first sliding-contact portion 45 which engages in sliding contact with the first reference surface 12.

Figure 10:
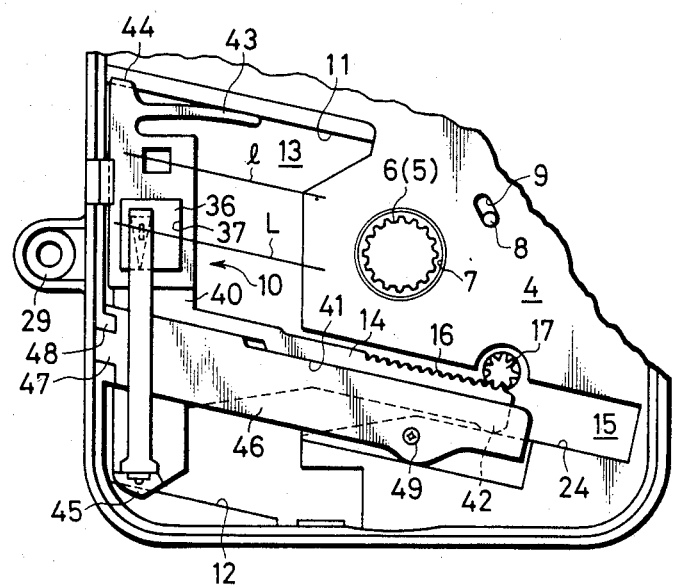
FIG. 10 is a plan view showing a head block disposed in a recording-reproducing termination position.
Figure 11:
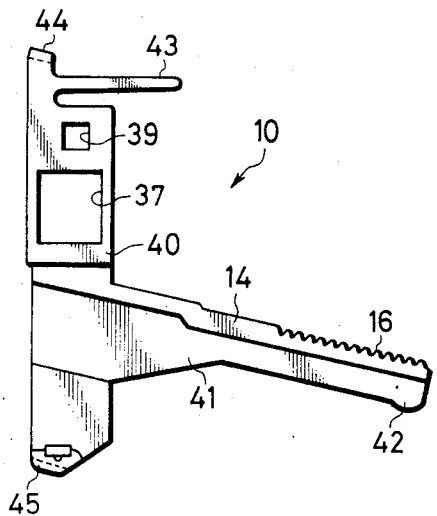
FIG. 11 is a plan view of the head block.
Figure 12:
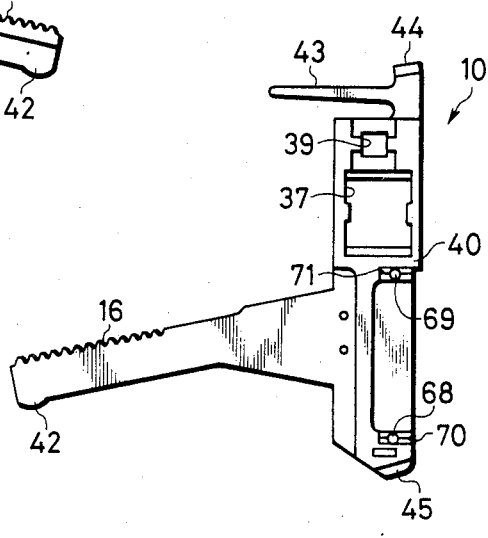
FIG. 12 is a bottom view of the same.
Figure 13:
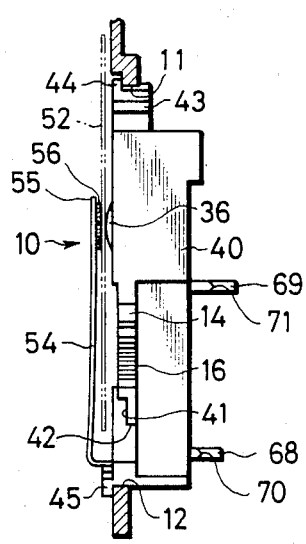
FIG. 13 is a right side view of the head block with a plate spring and support mechanism mounted thereon.
Figure 14:
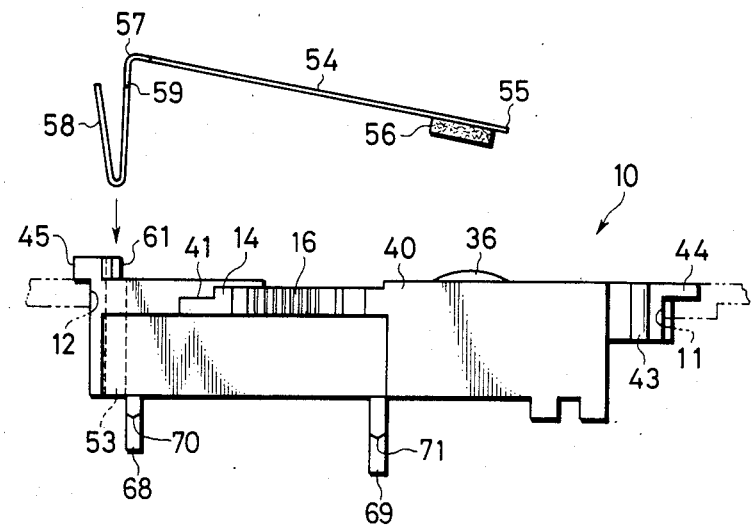
FIG. 14 is a side view showing the plate spring pad and the head block.

As shown in FIGS. 3 and 10, the magnetic head block 10 is arranged such that the block body 40 and the rack portion 14 are located at the opening portion 13 and at the recess portion 15, respectively, and the elastic arm 43 is elastically engaged with the side edge 11 with the engaging step portion 44 and the first sliding-contact portion 45 engaged with the side edge 11 and with the first reference surface 12, respectively. The first and second sliding-contact portions 45 and 42 are urged against the first and second reference surfaces 12 and 24, respectively, by the elasticity of the elastic arm 43 so that the head block 10 is maintained at a predetermined attitude.

During assembly, an engaging end portion 47 of a block holding member 46 is engaged with an engaging portion 48 of the casing 1, the block holding member is fitted into the step portion 41, and then a fixing screw 49 is tightened so that the block is prevented from floating. Thus, the head block 10 is mounted on the casing 1, movable along the first and second reference surfaces 12 and 24. A lead wire 50 of the magnetic head 36 is passed among three engaging pins 51 (see FIGS. 6 and 36) formed on the guiding portion 34 at its bottom surface and connected to the printed substrate 30. A plate spring pad 54 is supported on the magnetic head in such a manner as to urge a magnetic disc 52 against the magnetic head 36 by a suitable urging force.

Referring to FIGS. 13 to 18, a plate spring pad supporting structure will be described. A supporting hole 53 is formed in the vicinity of one end of the block body 40. The pad 54 is made of an elongated spring plate and is provided at its free end 55 with a pad member 56 fixed at a position in opposition to the magnetic head 36. The pad member 56 is made of felt or the like, and may be suitably shaped to be triangular, rectangular, etc. The plate spring pad 54 is bent on its bent portion 57 at an acute angle (less than a right angle) toward the free end and then folded back to a V shape so as to form an engaging portion 58. The width W1 of the engaging portion 58 is selected to be substantially equal to the width W2 of the supporting hole 53. A pair of shoulder portions 59 and 59 are formed in the vicinity of the bent portion of the engaging portion 58, and the width W3 of each part of the shoulder portions 59 is selected to be larger than the width W2 of the supporting hole 53. Respective receiving portions 61 and 61 are formed at the opposite sides of the upper end opening portion of the supporting hole 53, separated from a side edge 60 of the pad portion side by a distance d2 substantially equal to the thickness d1 of the plate spring pad 54. Each receiving portion 61 has a height equal to or slightly larger than that of the shoulder portion 59.

Figure 16:
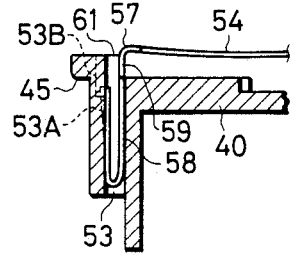
FIG. 16 is a cross-sectional view taken along a line C—C in FIG. 15 showing an assembled state.
Figure 17:
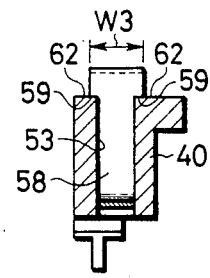
FIG. 17 is a cross section taken along a line D—D in FIG. 15 showing the assembled state.
Figure 18:
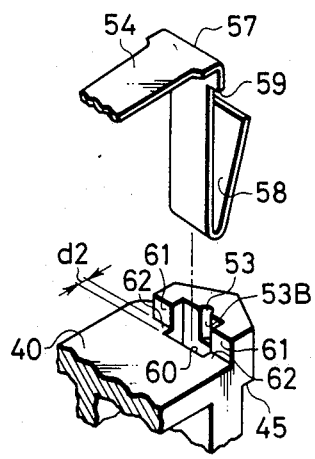
FIG. 18 is a exploded perspective view showing a main part of the plate spring and support mechanism.

When the widely opened engaging portion 58, having a depth larger than that of the supporting hole 53, is inserted into the supporting hole 53, the shoulder portions 59 engage with opposite side edge portions 62 of the supporting hole to limit further insertion, as shown in FIG. 16 and 17. At that time, respective portions, continuous with the shoulder portions 59 of the engaging portion, are located between the receiving portion 61 and the side edge 60 so that the respective back surfaces of the shoulder portions 59 and 59 are made to abut the receiving portions 61. That is, the depth of insertion of the engaging portion 58 is limited by shoulder portions 59 and the receiving portions 61 are disposed separately from the side edge 60 by the thickness of the spring plate so that the respective back surfaces of the shoulder portions are made to abut against the receiving portions. In other words, the plate spring pad 54 is fittingly supported by the supporting hole 53 without clash and the magnetic disc 52 is always urged against the magnetic head 36 by the stabilized force of the pad portion on the free end.

Figure 15:
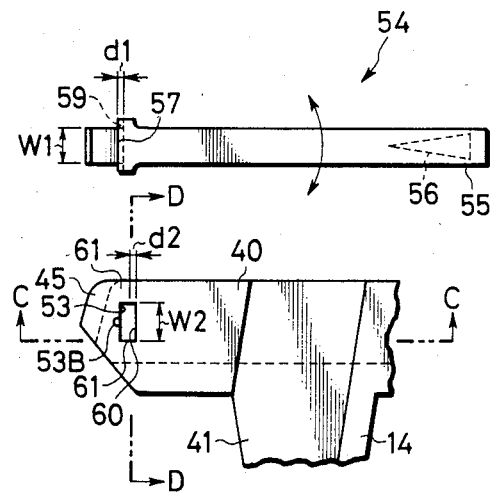
FIG. 15 is a plan view of the same.

Even if the plate spring pad 54 when fitted in the supporting hole 53 is urged to be swung in the direction of the arrow in FIG. 15, the pad 54 cannot be swung because the back surface of the shoulder portion 59 is backed up by the receiving portion 61. On the other hand, if the receiving portion 61 were not present, the engaging portion 58 would be easily bent. Further, if a step portion to be engaged with the engaging portion 58 at its end portion is formed in the supporting hole 53 at its inner surface, as shown by a chain line 53A in FIG. 16, the plate spring pad can be effectively prevented from coming off. Since the plate spring pad 54 cannot be removed once it has been attached as described above, a notch 53B is formed in the supporting hole 53 so that the pad 54 can be detached by inserting a screwdriver or the like into the notch 53B to push the engaging portion 58 against the shoulder portion 59 side.

Figure 7:
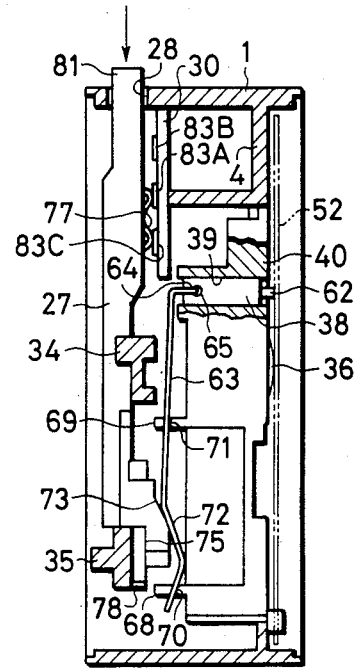
FIG. 7 is a cross-sectional view similar to FIG. 6 but showing a state where a mode changeover member is in the recording mode.

The erase head 38 is supported on the magnetic head block in such a manner that it can freely pass in and out. The erase head 38 is constituted by, for example, a plastic magnet or a permanent magnet, and is loosely inserted in the guiding hole 38 of the head block 10. As shown in FIGS. 6 and 7, the erase head 38 has at one end a head portion 62 of a width slightly larger than that of a recording track (not shown), and at its other end, a through hole 65 through which a stopping portion 64 at the forward end of a plate spring 63 is inserted.

Figure 20:
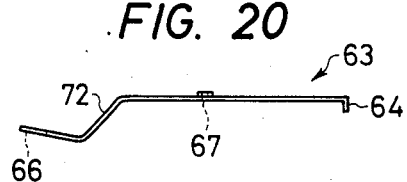
FIG. 20 is a side view showing an elongated plate spring.
Figure 21:
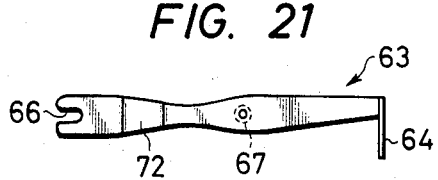
FIG. 21 is a plan view of the same.
Figure 22:
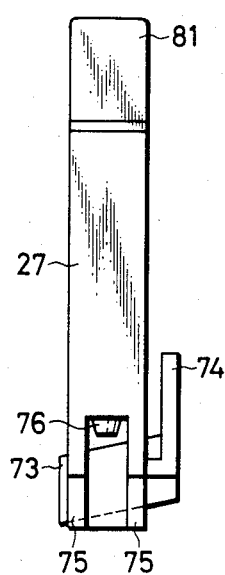
FIG. 22 is a plan view of a mode changeover member.
Figure 23:
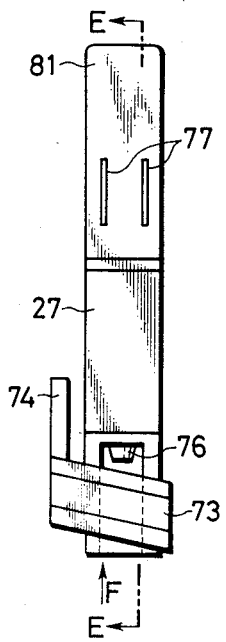
FIG. 23 is a bottom view of the same.
Figure 24:
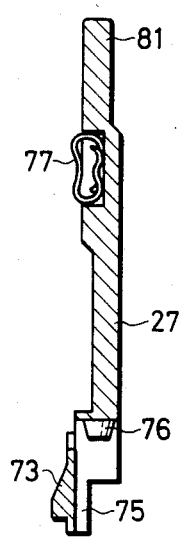
FIG. 24 is a cross-sectional view taken along a line E—E in FIG. 23.
Figure 25:
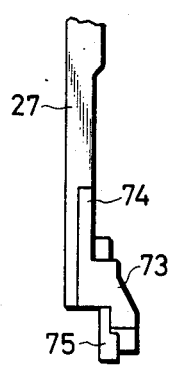
FIG. 25 is a left side view of a main part of FIG. 23.
Figure 26:
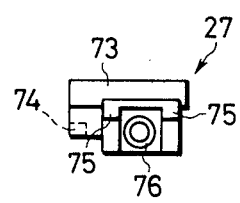
FIG. 26 is a front view viewed in the direction of an arrow F in FIG. 23.

As shown in FIGS. 20 and 21, the plate spring 63 is formed by bending and working an elongated plate spring, the forward end portion thereof being bent at a right angle to form the engaging portion 64. The plate spring 63 is formed with a notch 66 at its rear end portion, bent into a trough shape, and with an attachment hole 67 at its middle portion.

Figure 19:
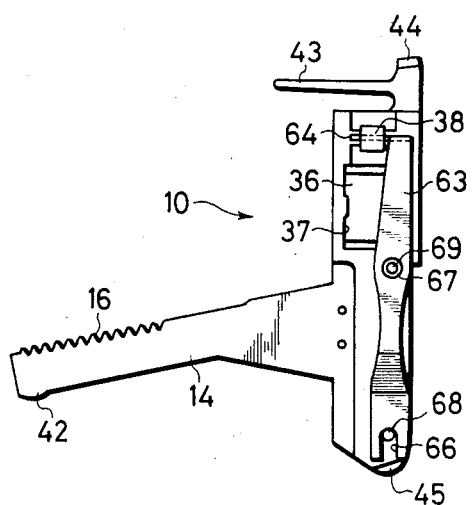
FIG. 19 is a bottom view of the head block with an erase head moving mechanism.

As shown in FIGS. 6, 7, 12 and 19, the bottom surface of the magnetic head block 10 is formed with supporting portions 68 and 69 which are loosely inserted through the notch 66 and the attachment hole 67 of the plate spring 63, respectively. The supporting portions 68 and 69 are respectively projectingly formed on fulcrum portions 70 and 71, each having an arch-shaped cross section. As shown in FIGS. 6, 7 and 19, the plate spring 63 is attached to the head block in such a manner that the engaging portion 64 is inserted through the through hole 65 of the erase head 38, and the notch 66 and the attachment hole 67 are engaged with the supporting portions 68 and 69, respectively. From the opposite side to the head block, a cam 73 faces a bent portion 72 of the plate spring 63 located between the notch 66 and the attachment hole 67 (see FIGS. 6 and 7).

As shown in FIGS. 6, 7 and 22 to 26, the cam 73 projects from the upper surface of the rear end portion of the mode changeover member 27, and the cam 73 extends parallel to the moving direction of the head block. An elastic stop 74 is provided on the cam 73 at one end thereof, extending parallel to the mode changeover member 27. Rail portions 75 are formed on the mode changeover member 27 at its rear end portion, and a spring seat 76 is located between the rail portions 75. Further, switching contacts 77 are fixed to the mode changeover member 27 at its upper surface.

As shown in FIGS. 6 and 35, the guiding rail portion 35 of the casing 1 is formed with guiding grooves 78 into which respective ones of the rail portions 75 are slidably fitted. A spring seat 79 is provided at the guiding rail portion 35. As shown in FIGS. 2, 6 and 36, on the under surface of the guiding portion 34 of the casing 1 is formed an abutting portion 80 against which the stop 74 comes into abutment.

As shown in FIGS. 2 and 6, the mode changeover member 27 is attached to the casing 1 in such a manner that an operating end 81 thereof projects out of the casing 1 through the hole 28. The rail portions 75 are fitted in respective ones of the guiding grooves 78. An extensible energizing spring 82 is inserted between the spring seats 76 and 79. The member 27 is thus guided by the hole 28, the guiding portion 34, and the guiding rail portion 35 so as to be slidably supported. At the time the switching contact 77 comes into contact with a mode changeover contact 83 of the printed substrate 30 (which is constituted by a common contact 83A), a reproducing mode contact 83B and a recording mode contact 83C, as shown in FIGS. 2, 6, 7 and 9.

Movement of the mode changeover member 27 causes the operating end 81 to project out of the casing 1 by the urging force of the energizing spring 82, this movement being limited by the stop 74 abutting against the portion 8a (FIGS. 2 and 6). At that time, the common contact 83A and the reproducing mode contact 83B are connected to each other through the switching contact 77 so that a circuit (not shown) is maintained in a reproducing mode, that is, the mode changeover member 27 is normally positioned to be urged to the reproducing mode position.

As shown in FIG. 6, when the mode changeover member 27 is in its reproducing mode, the cam 73 abuts the plate spring 63 at its position 84 located between the supporting portions 68 and 69 so as to deform the plate spring; that is, the portion 84 is pushed by the cam 73 so that the plate spring 63 is urged against the fulcrums 70 and 71 so as to be deformed, and the erase head 38, engaged and stopped by the engage-stopping portion 64, is moved into the guiding hole 39.

In the case where an electromagnet is used as the erase head, it is not necessary to make the erase head pass in and out. Therefore, in such a case, it is sufficient to fix the erase head to the magnetic head block and energize the same in the recording mode.

A description will now be given as to the spring drive source and the governor.

Figure 8:
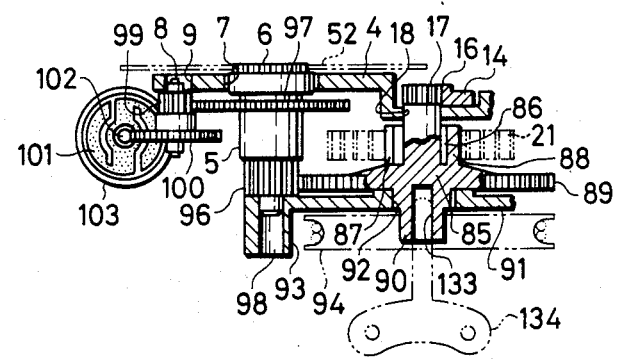
FIG. 8 is a cross section taken along a line B—B in FIG. 4 showing a spring drive source and governor.
Figure 9:
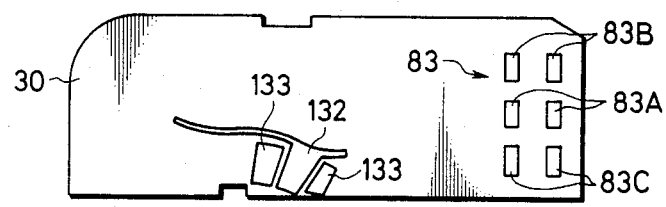
FIG. 9 is a plan view showing a main part of a printed substrate.

In FIG. 8, the pinion 17 meshed with the rack 16 is formed at one end of a spring winding shaft 85 on which are integrally formed an annular peripheral gap 86 for engaging the spring 21 at its inner end, a shaft portion 88 having a slit 87 (see FIG. 27), and a drive gear 89. A protrusion 87A is formed at one side of the slit 87 so as to prevent the inner end of the spring 21 from entering in the reverse direction. The pinion 17 projects through the hole 18 of the substrate 4 and meshes with the rack 16. On the other end of the spring winding shaft 85 a rectangular shaft portion 90 (see FIG. 2) is formed, projecting into a rotary body storage portion 93 (see FIG. 32) through a hole 92 of an inner casing 91 fixed to the casing 1. The inner casing 91 will be described later.

The rectangular shaft portion 90 is fitted in a rectangular hole 95 of the rotary body 94. The drive gear 89 is meshed with a gear 96 (see FIG. 4) formed on the disc supporting shaft 5 on which another gear 97 is formed. The disc supporting shaft 5 is rotatably supported in such a manner that the base portion of the hub 6 and the other end of the shaft 5 are fitted into the hole 7 of the substrate 4 and into a supporting hole 98 of the inner casing 91, respectively. The gear 97 is meshed with a gear 99 formed on the clutch shaft 8 on which another worm wheel 100 is formed. The clutch shaft 8 is supported by the supporting elongated holes 9 and 100A (see FIGS. 5 and 38) which are formed on the substrate 4 and the inner casing, respectively, about the holes 7 and 98 through which the disc supporting shaft 5 is supported so as to be movable within the regions of the elongated holes. The worm wheel 100 is selectively meshed with a worm shaft 102 of a governor rotary body 101 which is formed by a comma-shaped elastic body made of material such as rubber or the like and fixed at its inner end to the worm shaft 102. The rotary body 101 is made to be in close contact at its outer circumference with the inner peripheral surface of a braking cylinder 103. As shown in FIG. 36, the braking cylinder 103 is fixed to the bottom surface of the substrate 4. The worm shaft 102 is rotatably supported at its one end by the foregoing braking cylinder 103 and at its other end by a bearing groove 104 (see FIG. 36) of the substrate.

Figure 28:
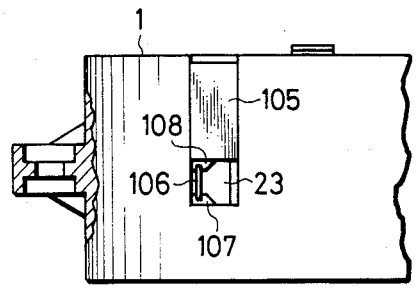
FIG. 28 is a turned-over front view showing a spring winding inlet.
Figure 29:
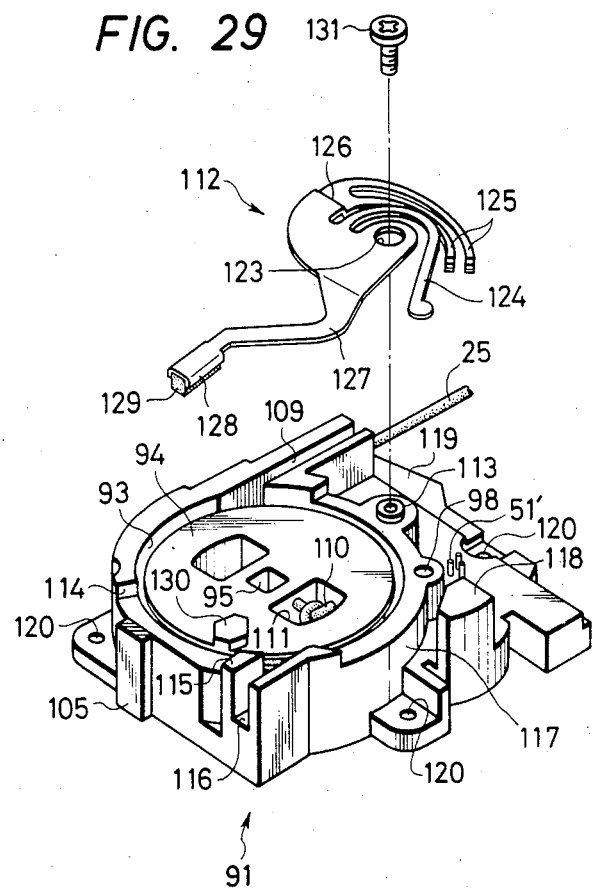
FIG. 29 is an exploded perspective view showing a spring operating region limiting switch.

As shown in FIGS. 27 and 28, the spring 21 to be wound around the spring winding shaft 85 is fed from the spring winding inlet 23 and wound around the winding shaft, which is rotated for this purpose. The spring winding inlet 23 is constituted by a notch formed in the side wall of the casing 1 and a closed portion 105 of the inner casing 91 engaged with the notch. An outer end 106 of the spring 21 is engaged with engaging/stop protrusions 107 and 108 respectively formed on the casing 1 and on the upper surface of the inner casing 91.

As shown in FIGS. 2 and 29 to 31, a winding cord lead-out portion 109 is formed in the rotary body storage portion 93 storing the rotary body 94. The rotary body 94 is constituted by a pulley formed at its circumference with a cord winding peripheral groove and is engaged with one end 110 of the winding cord, which is received in a recess portion 111 of the rotary body 94. The winding cord 25 is pulled out of the casing 1 through the winding cord lead-out portion 109 and the hole 26 (see FIG. 2).

The arrangement of a spring operating region limit switch will be described.

Figure 38:
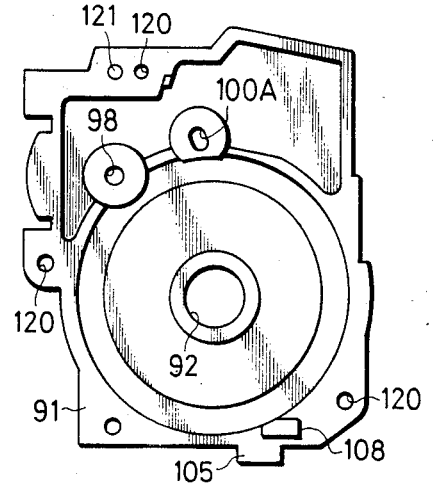
FIG. 38 is a plan view of the same.
Figure 39:
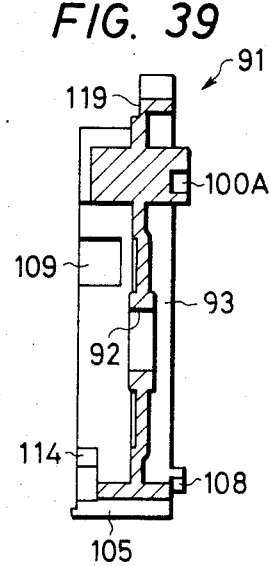
FIG. 39 is a cross-sectional view taken along a line H—H in FIG. 37.
Figure 40:
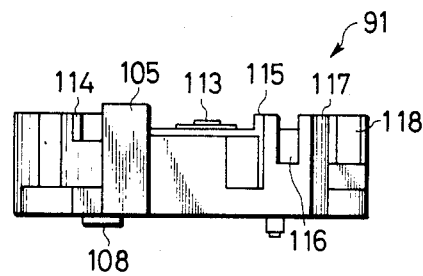
FIG. 40 is a front view when

In FIGS. 29 and 37 to 40, a shaft portion 113 rotatably supporting a stop 112, and a spring winding termination limit step portion 114 and a spring releasing termination limit step portion 115 for limiting the amount rotary displacement of the winding spring, are formed in the inner casing 91 on its peripheral wall forming the rotary body storage portion 93. In the case illustrated in the drawing, another winding cord lead-out portion 116 is provided, which is communicated with the hole 33 as shown in FIG. 2. A stop member 118 is projectingly formed outside a peripheral wall 117. In the inner casing 91, there are formed a step portion 119 for mounting the printed substrate 30 at one side thereof and holes 120 through which screws for fixing the inner casing 91 to the casing 1 pass. As shown in FIG. 38, on the upper surface of the inner casing 91, there is formed a positioning and guiding pin 121 to be fitted into a positioning and guiding hole 122 (see FIG. 36).

As shown in FIG. 2 and 29 to 33, the stop 112, formed by processing a spring plate material, is constituted by a hole 123 through which the shaft portion 113 is fitted, an elastic arm 124 and switch portions 125 which are concentrically and circularly formed about the hole 123, a bent lead wire soldering portion 126, an arm portion 127 curved so as to not pass through a center of rotation of the rotary body 94 when the stop is rotated to the spring winding termination position shown in FIG. 2, a limit portion 128 formed at the forward end of the arm portion, and a friction member 129, made of a material such as rubber and attached to the limit portion. The elastic arm 124 extends to the position in which the elastic arm can abut against the stop member 118 (see FIG. 30) when the stop is rotated. The limit portion 128 is bent in a downwardly opening channel shape and extends to the position in which the stop can engage with the spring winding termination limit step portion 114 (see FIG. 2) and the releasing termination limit step portion 115 (see FIG. 31). The lead wire connected to the soldering portion 126 is passed among three engaging pins 51', led out through the notch 32, and connected as in FIG. 29. The switch portion 125 is bifurcated in order to improve its reliance.

Figure 32:
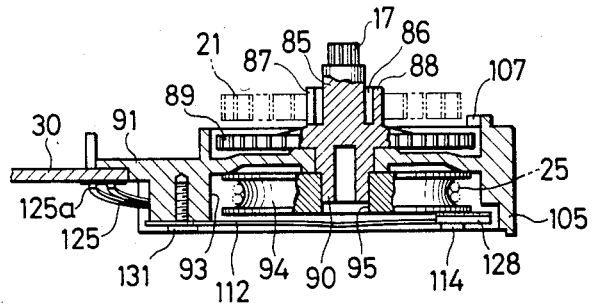
FIG. 32 is a cross-sectional view taken along a line G—G in FIG. 2.
Figure 33:
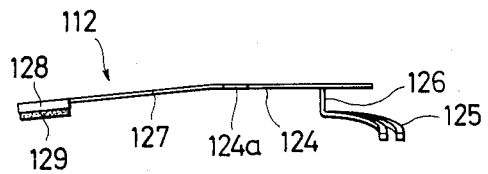
FIG. 33 is a side view showing a stop in its free state.

The peripheral portion of one end surface of the rotary body 94 is processed into a rough surface in order to provide a frictional force when the rotary body 94 comes into contact with the friction material 129 attached to the limit portion 128. An engaging portion 130 is formed projectingly from a part of the rough surface. As shown in FIG. 33, the stop 112 is bent in its free state in order to impart elasticity to the limit portion 128 and the switch portions 125. As shown in FIG. 32, the thus arranged stop 112 is rotatably fixed to the shaft portion 113 by a screw 131, and the friction member 129 of the limit portion 128 is made to be in elastic sliding contact with the rotary body 94 at its rough surface. The respective ends of the switch portions 125 are located so as to be able to make sliding contact with a power contact 132 and an isolating contact 133 of the printed substrate 30. The contacts 132 and 133 are formed to be partially circular in shape and a located side by side about the shaft portion 113 which defines the center of rotation of the stop 112. The contact 132 is connected to one end of a battery cell used as a power supply for a recording and reproducing circuit (not shown), the other end of the cell being connected to the soldering portion 126. The isolating contact 133 and the contact 132 are disposed with a slit therebetween, the isolating contact 133 being provided for protecting the switch portions 125 when the power supply is turned off at the opposite ends of rotation of the stop 112.

The stop 112 is displaced by a frictional force generated between the friction material 129 and the rough surface as the rotary body rotates in a manner to be described later in detail. However, the stop 112 cannot be displaced by the foregoing frictional force after the elastic arm 124 has been abutted against the preventing portion 118, while the stop 112 is displaced when it is urged by the engaging portion 130.

Although the rotary body 94 fitted in the rectangular shaft portion 90 of the spring winding shaft 85 and the winding cord 25 are used as the spring winding members in the foregoing embodiment, alternatively, spring winding may be performed in such a manner that, as shown in FIG. 8, a rectangular hole 133 is formed in the rectangular shaft portion 90 and a winding key 134 is engaged with the hole 133 and rotated to wind the spring. Alternatively, other winding mechanisms such as gears, a rack and a pinion mechanism, or the like, may be selected.

The magnetic disc 52 is mounted in such a manner that the recording surface is caused to come into contact with the magnetic head 36, and an engaging hole 135 formed in the center portion of the disc 52 is engaged with the hub 6, as shown in FIG. 1. The plate spring pad 54 is attached to the head block 10 after the magnetic disc is mounted so that the disc contacts the magnetic head 36 with a predetermined force.

Operations of the thus-arranged magnetic recording-/reproducing apparatus according to the present invention will be described. The operations may be generally divided into three modes, namely, a recording mode, a reproducing mode, and a spring winding mode preceding the two foregoing modes. A description will be given of each of these modes. WINDING MODE:

This mode is executed for winding the spring used as a drive source. Initially, the spring is in its released state, the stop 112 is in the state shown in FIG. 31, the power switch is in its off state, and the magnetic head 36 is positioned at its recording/reproducing termination position, that is, at the outermost side of the track of the magnetic disc 52. At this time, the magnetic head block 10 and the rotary body 94 as well as the stop 112 are located at the positions shown in FIGS. 10 and 31, respectively.

Figure 31:
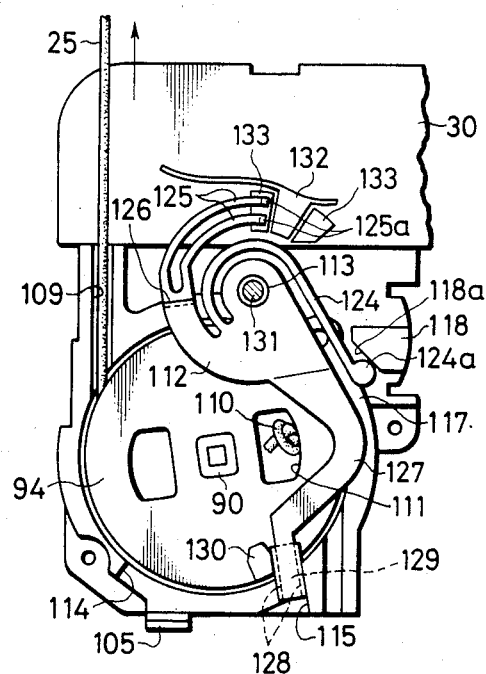
FIG. 31 is a bottom view showing the same in the off state.

In FIG. 10, the magnetic head block 10 is in such a state that the first and second sliding contact portions 45 and 42 are urged against the first and second reference surfaces 12 and 24 by the elasticity of the elastic arm 43 so that the pinion 17 is meshed with the rack 16. In FIG. 31, the limit portion 128 of the stop 112 is urged against the spring releasing termination limit step portion 115 by the engaging portion 130. The elastic arm 124 is then engaged with the stop member 118 and elastically deformed, and the switch portion 125 is in contact with the isolating contact 133. That is, the power switch is in its off state. In this state, the winding cord 25 is wound around the rotary body 94. The steps in reaching this state will be described in more detail below with reference to the recording mode.

Figure 30:
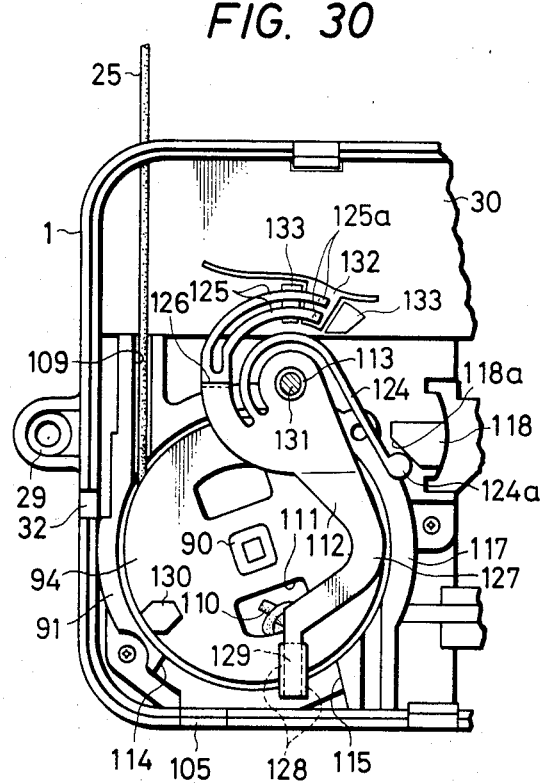
FIG. 30 is a bottom view showing the same in its on state.

In FIG. 31, when the winding cord 25 is drawn in the direction of an arrow from the outside of the casing, the rotary body 94 is rotated clockwise. As shown in FIG. 30, the engaging portion 130 of the rotary body 94 has moved away so that the stop 112 is swung clockwise by the elasticity of the elastic arm 124 and the limit portion 128 is separated from the spring releasing termination limit step portion 115. Thereafter, the stop 112 is further swung clockwise by the friction generated between the rough surface of the rotary body 94 (which is being rotated) and the friction material 129 of the limit portion 128, and abutted against the spring winding termination limit step portion 114 so as to prevent the stop 112 from being swung. When the rotary body 94 is rotated from the position shown in FIG. 31 through about 400 degrees, as shown in FIG. 2, the engaging portion 130 engages with the limit portion 128. The rotation of the engaging portion 130 is limited and the winding cord 25 can be drawn no longer, thereby completing the spring winding operation.

At that time, the forward end 125a of a spring winding switch portion 125 passes over the power contact 132 to the opposite side where it contacts the isolating contact 133, resulting in turning off the power switch. The power switch is turned off after it has been kept on for a very short time period during which the stop 112 is swung from the spring releasing termination position shown in FIG. 31 to the spring winding termination position shown in FIG. 2.

The rotary body 94, which is rotated by the tension of the winding cord 25, causes the spring winding shaft 85 to rotate so as to wind spring 21 engaged therewith (see FIGS. 8 and 32). When the spring winding shaft 85 is rotated, the pinion 17 is rotated and the head block 10 is moved to the starting position.

Figure 4:
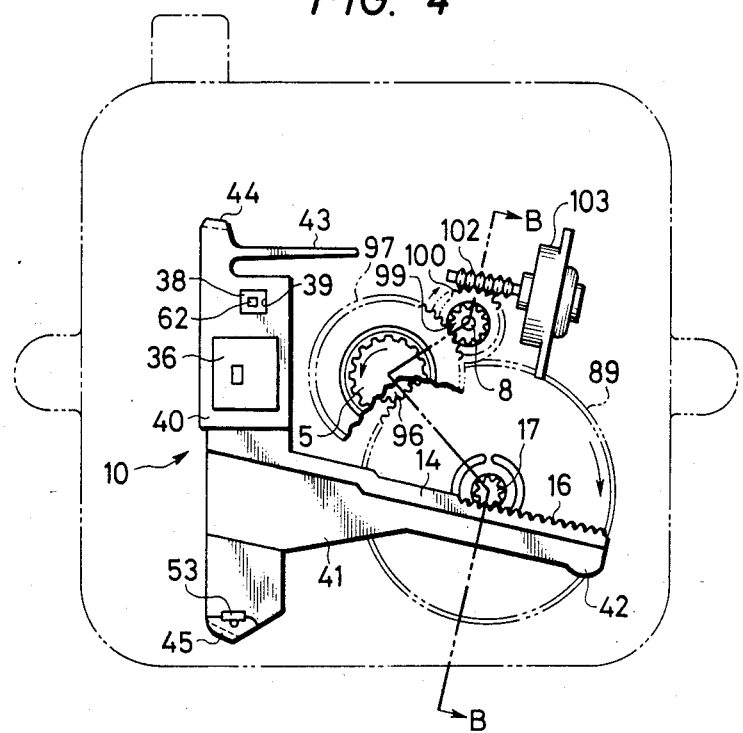
FIG. 4 is a plan view showing a head block, spring drive source, and governor, and illustrates a state where the spring has been released.
Figure 5:
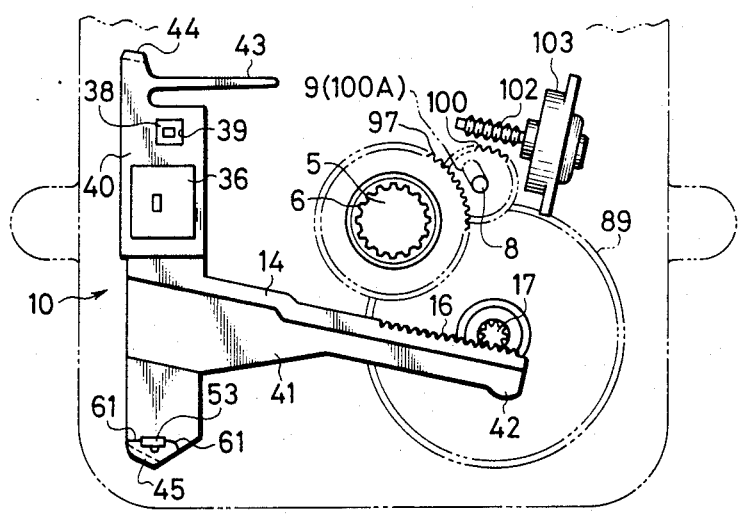
FIG. 5 is a plan view showing the same components as FIG. 4 in the state in which the spring has been wound.

In FIG. 5, the pinion 17 and the drive gear 89 are rotated counterclockwise in response to the rotation of the spring winding shaft 85. As the pinion rotates, the magnetic head block 10, meshed with the pinion 17 through the rack 16, is moved rightward in FIG. 5, and the head block is placed at the starting position shown in FIG. 4 (also seen in FIG. 3) when the spring winding operation has been terminated. In FIGS. 5 and 8, the rotation of the drive gear 89 causes the disc supporting shaft 5 to rotate through the gear 96, and the rotation of the shaft 5 to rotate through the gear 96, and the rotation of the shaft 5 causes the magnetic disc 52 (see FIG. 1) to rotate. When the disc supporting shaft 5 is rotated clockwise in FIG. 5, the gear 99 meshed with the gear 97 of the shaft 5 is caused to perform planetary movement around the shaft 5 to thereby separate the worm wheel 100 from the worm shaft 102. The gear 99 and the clutch shaft 8 constituting the shaft of the worm wheel 100 are moved within the regions of the elongated holes 9 and 100A (see FIGS. 35 and 38). When the worm wheel 100 is separated from the worm shaft 102, the braking operation of the governor rotary body 101 (see FIG. 8) is defeated so that the spring can be easily wound.

In the spring winding operation, the mode changeover member 27 is not operated at all, and therefore the erase head 38 is held in a position offset from the magnetic disc 52 (see FIG. 6). RECORDING MODE:

In this mode, the wound spring is released to rotate a magnetic disc so as to record sound on the rotating magnetic disc.

As shown in FIG. 2, the state in which the spring has been wound and the power switch is turned off is maintained by pulling the winding cord 25. As shown in FIG. 7, the mode changeover member 27 is then pushed in against the elasticity of the energizing spring 82 (see FIG. 6) so that the common contact 83A and the recording mode contact 83C are connected to each other through the switch contact 77, and a circuit (not shown) is changed to the recording mode. A power supply circuit of a lamp for indicating the recording mode is turned on in response to the changeover of the mode changeover contact 83 so that the lamp can be lit when the power switch (described later) is turned on.

As shown in FIG. 7, when the mode changeover member 27 is pushed in, the cam 73 is brought into opposition with the bent portion of the plate spring 63 so that the plate spring 63 is elastically returned to its free state and the erase head 38, engaged with the free end of the plate spring 63, is moved in the guiding hole 39 to cause the head portion 62 thereof to come into contact with the magnetic disc 52. The contact pressure at this time is made constant due to the relatively soft elasticity at the free end of the plate spring 63 having a fulcrum at which the cam 73 abuts on a bent portion 72. It is evident that the head portion 62 comes into contact with the upstream position of the magnetic track traced by the magnetic head 36 with respect to the direction of rotation of the magnetic disc 52 in recording.

If the force applied to the winding cord 25 is released with the mode changeover member 27 in its pushed-in state, the rotary body 94 positioned as shown in FIG. 2 is rotated counterclockwise by the releasing force of the spring. When the engaging portion 130 is moved due to rotation of the rotary body in the same direction, the stop 112 is swung in the same direction by the frictional force acting between the rough surface and the friction material 129. When the stop 112 is swung, the forward end 125a of the switch portion 125 thereof comes into contact with the power contact 132 so as to turn the power switch on. This power switch can be turned on with little delay as soon as the force on the winding cord 25 is released. Accordingly, sound may be recorded by talking into a microphone (not shown) substantially at the same time as the release of the winding cord 25. The winding cord 25 is wound around the outer periphery of the rotary body 94.

When the stop 112 reaches a position by being swung through about 40 degrees by the frictional force with the rotary body 94, the forward end 124a of the elastic arm 124 of the stop will abut the surface 118a of the stop member 118 (as shown in FIG. 30), and the stop 112 is then prevented at this point from further swinging because the elasticity of the elastic arm 124 overcomes the frictional force generated between the rough surface and the friction material 129. The rotary body 94 continues to rotate while its rough surface remains in sliding contact with the friction material 129. As shown in FIG. 30, the stop 112, which is prevented from swinging by the elastic arm 124, maintains the state in which the switch portion 125 is held in contact with the power contact 132, that is, the power switch is maintained in its on state.

On the other hand, when the spring is released, the spring winding shaft 85 is rotated so as to cause the pinion 17 to rotate clockwise (in FIG. 4). In FIG. 4, as the pinion 17 rotates, the rack 16 meshed with the pinion is moved leftward. The rotation of the spring winding shaft 85 causes the gear 99 to rotate in the direction of an arrow in FIG. 4 through the drive gear 89 and the gears 96 and 97. The gear 99 is rotated by the gear 97 to perform planetary movement around the gear 97 so that the gear 99 is meshed with the worm shaft 102 to cause the worm shaft 102 to rotate. That is, the rotation of the spring winding shaft 85 is transmitted to the worm shaft 102 through a speed-increasing gear driven from the drive gear 89 so as to cause the governor rotary body 101 (see FIG. 8) to rotate at a high speed. When the rate of rotation of the governor rotary body 101 becomes faster than a predetermined speed, the rotary body 101 is widely opened by centrifugal force so as to come into sliding contact with the inner surface of the braking cylinder 103 to thereby receive a braking force. The sliding contact and separation between the governor rotary body 101 and the braking cylinder 103 are continued until the force of the spring is released so that the rotation of the speed increasing gear is held at a predetermined speed. That is, the disc supporting shaft 5 and the spring winding shaft 85 are rotated at a predetermined speed.

Since the pinion 17 and the hub 6 are rotated in synchronism with each other at a predetermined speed, the magnetic head block 10 is moved by the pinion 17 at a predetermined speed and the magnetic disc 2 engaged with the hub 6 is also rotated at a predetermined speed. The linearly moving magnetic head 36 comes into spiral sliding contact with the rotating magnetic disc 25. The previously recorded track on the recording track to be traced by the magnetic head 36 has been erased by the head portion 62 of the erase head (see FIG. 1) at a position immediately before the tracing. The magnetic head 36 performs magnetic recording over the erased track. Respective loci of movement of the magnetic head 36 and the erase head (the head portion 62) are substantially parallel to the radial direction of the magnetic disc 52, as shown by lines L and l in FIG. 1.

When the magnetic head block 10 is moving during recording, the first and second sliding-contact portions 45 and 42 are urged against the first and second reference surfaces 12 and 24 by the elasticity of the elastic arm 43, as shown in FIG. 3, so that the magnetic head 36 is caused to move along the line L indicated in FIG. 1 while maintaining the magnetic head block 10 oriented at a predetermined attitude.

The magnetic disc 52 is urged against the magnetic head 36 by the plate spring pad 54. Since the plate spring pad 54 is supported by the head block with the engaging portion 58 at the base portion thereof engaged by the supporting hole 53 of the head block, the free end of the plate spring pad has a tendency to swing in the direction of delay from the magnetic head 36 due to friction generated between the pad member 56 and the magnetic disc 52 as the magnetic head block 10 moves. However, because the rear face of the shoulder portion 59 of the plate spring pad 54 abuts the receiving portion 61 (see FIG. 16), the pad 54 is completely prevented from swinging. Accordingly, the pad member 56 is always held in opposition at the desired position to the magnetic head 36 so as to cause the head 36 and the magnetic disc 52 to be always in contact with each other with a predetermining urging force acting therebetween.

FIG. 30 shows a state in which the power switch is maintained in its on state by the stop 112 and in which, when the releasing energy of the spring is almost exhausted, the engaging portion 130 of the rotary body 94 engages the limit portion 128.

In FIG. 31, the stop 112 engaged by the engaging portion 130 is urged by the rotation of the rotary body 94 while elastically deforming the elastic arm 124 against the elasticity of the arm, and then the limit portion 128 is abutted against the spring releasing termination limit step portion 115. The prevention of movement of limit portion 128 prevents rotation of the rotary body 94. Thus, although the spring 21 has a reserve of energy, the drive force is cut off in order to obtain a good operating region.

When the rotary body 94 is stopped, the gear connected thereto is stopped. That is, upon the stopping of the movement of the pinion 17, the movement of the magnetic head block 10 terminates, and when the hub 6 stops moving, the rotation of the magnetic disc 52 is ended. At that time, the magnetic head is located at the outermost end of the track of the magnetic disc 52.

On the other hand, when the stop 112 is urged by the rotary body 94, the forward end 125a of the switch portion 125 comes over the power contact 132 to come into contact with the isolating contact 33, as shown in FIG. 31, thereby turning the power switch off. The stopping of the rotation of the magnetic disc 52, that is, the termination of the recording mode, can be detected from the fact that the winding cord 25 is pulled into the casing 1 and is no longer moving. Alternatively, there may be provided a recording mode indicating lamp which is turned on when the mode selecting member 27 is urged inwardly and the power switch is in its on state. In any case, when the mode selecting member 27 is released after the force of the spring has been limited, the erase head 38 with its head portion 62 maintained in contact with the magnetic disc 52 (as shown in FIG. 7) during the recording mode is retracted into the guiding hole 39 (as shown in FIG. 6) by the plate spring 63 bent by the cam 73. If the spring is wound up under the condition that the mode changeover member 27 is pushed in, the track is traced by the head portion 62 of the erase head so as to perform erasure.

REPRODUCING MODE

This mode is executed for reproducing a sound signal recorded on the magnetic disc.

The winding mode as described above is executed before reproducing. Since the winding mode has been described, a further explanation will be omitted and only the states of the respective members upon completion of winding will be described.

As shown in FIG. 6, the erase head 38 is pulled into the guiding hole 39 by the plate spring 63, which is deformed by the cam 73 of the mode changeover member 27. The common contact 83A and the reproducing mode contact 83B are connected to each other through the switch contact 77, and the circuit (not shown) is thus set in the reproducing mode.

As shown in FIG. 2, the stop 112 is urged by the engaging portion 130 of the rotary body 94 so that the forward end 125a of the switch portion 125 is made to contact the isolating contact 133 to thereby turn the power switch off. A restraint force is imparted to the winding cord 25 for resisting against the releasing force of the spring.

As shown in FIGS. 1 and 3, the magnetic head 36 is positioned at the inner end of the track (not shown) of the magnetic disc 52. That is, at this time, the position of the magnetic head 36 is the same as the starting position in the recording mode so that the magnetic head is automatically indexed upon completion of winding.

When the force on the winding cord 25 is removed, the rotary body 94, disposed as shown in FIG. 2, is rotated counterclockwise by the force of the spring. As the rotary body 94 rotates, the stop 112 is rotated through the state of FIG. 30 in which the power switch is maintained in its on state, and then further rotated to the state of FIG. 31 in which the power switch is turned off. This operation is the same as that in the recording mode described above, and a further explanation will be omitted for avoiding repetition.

The rotary body 94 is driven by the releasing force of the spring, which is governed, as shown in FIG. 4, by the action of the speed-increasing gears, the worm shaft 102, the governor rotary body 101, and the braking cylinder 103 so that the pinion 17 and the hub 6 are rotated at a constant speed, the speed-increasing gears being constituted by the drive gear 89, the gears 96, 97 and 99, and the worm wheel 100.

Therefore, as shown in FIG. 1, the magnetic head 6 is moved along the line L. The relative movement between the magnetic disc and head allows the magnetic head 36 to spirally trace the recorded track so as to read the sound signal previously recorded on the track. The sound signal is reproduced through a speaker (not shown).

In the reproducing mode, the magnetic head block 10 is moved while held at a predetermined attitude, and the magnetic disc 52 is urged against the magnetic head 36 by the plate spring pad 54 disposed in a stabilized position in the same manner as described with reference to the recording mode.

The reproducing mode is terminated when the engaging portion 130 of the rotary body urges the stop 112 to cause the limit portion 128 thereof to abut against the spring releasing termination limit step portion 115 so as to prevent the rotary body from rotating. When the forward end 125a of the switch portion 125 is separated from the power contact 132 and comes into contact with the isolating contact 133, the power switch is turned off. The winding cord 25 is pulled into the casing upon termination of the reproducing mode.

Although there may occur variations in the rotational speed of the magnetic disc since the releasing force of the spring is mechanically governed by the drive force, because the driving conditions in the recording mode are substantially the same in the reproducing mode, there occurs no relative speed difference between the two modes so that good reproduced sound can be obtained. Particularly, in the described embodiment, the gears including the worm wheel are always meshed with each other so that the driving condition is not changed at all.

Figure 34A:
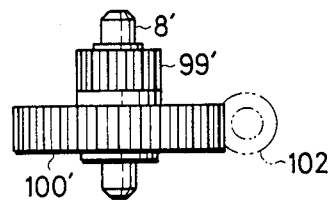
FIG. 34A is a main part front view showing a modification of a clutch.
Figures 34B, 34C:
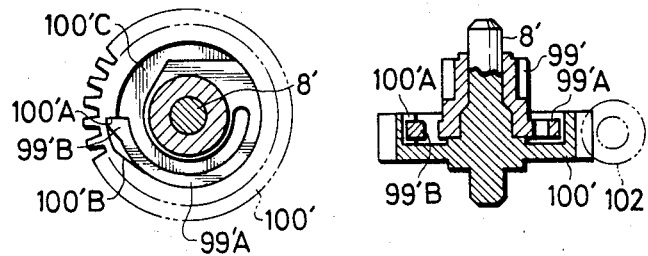
FIG. 34B shows a top view of the clutch part of FIG. 34A.
FIG. 34C is a cross-sectional view of the clutch part of FIG. 34A.

Although the gear shaft 8 is supported by the elongated holes 9 and 100A so that the governor is operated through planetary movement only in releasing the spring in the embodiment described above, an arrangement such as shown in FIGS. 34A to 34C may alternatively be used. That is, a shaft 8' is supported by a circular hole (planetary movement cannot be performed) and a worm wheel 100' is integrally formed on the shaft 8', an arm portion 99'A integrally formed on a gear 99' inserted into an inner recess portion 100'C. An engaging portion 100'A and a slanting surface 100'B are formed at a part of the recess portion 100'C. On the other hand, a pawl portion 99'B is formed on the arm portion 99'A. In winding the spring, the gear 99' is rotated counterclockwise in FIG. 34B, but this rotation is not transmitted to the worm wheel 100'. In releasing the spring, the gear 99' is rotated clockwise in FIG. 34B and the pawl portion 99'B abuts against the engaging portion 100'A to engage therewith so that the worm wheel 100' is rotated so as to rotate the worm shaft 102 to cause the governor to operate. In this arrangement, the shaft 8' is rotated only in releasing the spring not rotated in winding the spring.

As described above in detail, according to the magnetic recording/reproducing apparatus of the present invention, recording/reproducing can be performed by using a spring as a drive source, and moreover the apparatus can be reduced in size. Since a magnetic disc and a magnetic head are driven by a rotary force of a spring winding shaft which rotates reciprocatively, and no shift occurs in tracking between recording and reproducing modes. The operating region of the spring is limited so that indexing of the track can be performed merely by performing winding of the spring. Since no electric motor is used as a drive source, the apparatus consumes little electrical power and can be reduced in weight as well as in size. Further, parts made of a synthetic resin material can used so as to make the apparatus inexpensive and therefore preferable for use in a toy.

I claim:

1. A magnetic recording/reproducing apparatus comprising:

a disc supporting shaft for engaging and stopping a magnetic disc;

a spring drive source for rotationally driving said disc supporting shaft;

means for winding a spring of said spring drive source;

governor means for controlling a releasing force of said spring to thereby cause said disc supporting shaft to rotate at a constant speed;

a magnetic head linearly moving in synchronism with said disc supporting shaft and relatively spirally moving along said magnetic disc in sliding contact therewith;

an erase head supported by a head block carrying said magnetic head;

a mode changeover member for selectively selecting between a recording mode and a reproducing mode, said member being normally urged to a position of said reproducing mode;

means for limiting an operating range of said spring; and a power switch for turning on/off supply of power for a recording/reproducing circuit.

2. The recording/reproducing apparatus according to claim 1, in which said limit means comprises a stop for limiting an operating region of said spring, a part of said stop forming a movable contact of said power switch so as to automatically turn off said power switch at a release termination position of said spring.

3. The recording/reproducing apparatus according to claim 2, in which said limit means comprises a switch means also operating for limiting said operating region of said spring, said switch means comprising a rotary body rotated in a forward and a reverse direction by a winding and a releasing operation of said spring, respectively, a stop member in sliding contact with an end surface of said rotary body and being movable in a direction of rotation of said rotary body, means for restricting a region of displacement of said stop member, a switch arranged to be turned off by a switch portion integrally formed on said stop at least when said stop member is positioned at said spring release termination position, said rotary body being formed at its end surface with an engaging portion for forcing said stop to move, said stop member being formed with an elastic arm for preventing said stop member from moving by overcoming a frictional force between said stop member and said rotary body, whereby said elastic arm maintains said stop member in a switch-on state at a position immediately before said spring release termination position and said engaging portion forces said stop member to move into said spring release termination position to thereby urge said stop member against said restriction means to stop said rotary body and at the same time turn said switch off.

4. The recording/reproducing apparatus according to claim 1, in which said head block comprises a rack portion for supporting said recording/reproducing magnetic head and said erase head and meshed with a drive means, two sliding contact portions slidably contacting with respective reference surfaces each extending parallel to a direction of movement of said heads, and an elastic arm for urging said sliding contact portions against said respective reference surfaces.

5. The recording/reproducing apparatus according to claim 1, further comprising an erase head moving mechanism, said head block comprising two plate spring supporting portions and an erase head supporting portion, said erase head being fitted with said erase head supporting portion so as to enable said erase head to move in and out of an erase supporting portion, an elongated spring plate, a part of said erase head being engaged with a front end of said elongated plate spring, said plate spring being supported by said two plate spring supporting portions at an intermediate and a rear end portion of said plate spring, respectively, and a cam movably facing a surface of said plate spring at an opposite side to said magnetic head block between said two supporting portions so that displacement of said cam deforms said plate spring to cause said erase head to move in/out of said magnetic head block.

6. The recording/reproducing apparatus according to claim 1, in which said head block is provided with a spring plate supporting mechanism comprising an elongated plate spring formed with a pad portion at its free end and a V-shaped engaging portion at its base end portion, said engaging portion being formed such that said plate spring is bent at its bent portion substantially at a right angle relative to said free end and folded back to form said V-shaped engaging portion, a wide width stepped portion being formed in a vicinity of a bent portion of said engaging portion, a supporting hole being formed in said pad supporting portion and having a width which allows said V-shaped engaging portion to enter but prevents said stepped portion from entering, and receiving portions for abutting on a rear surface of said stepped portion, said receiving portions being formed at both sides of said supporting hole and in positions separated from a pad side edge of said supporting hole by a distance substantially corresponding to a thickness of said plate spring.

7. The recording/reproducing apparatus according to claim 1, in which said governor means comprises gear means for transmitting a releasing force of said spring to a governor rotary body, and a unidirectional transmission mechanism having only one engagement portion included in said gears.

* * * * *